(12) United States Patent
Clevenger et al.

(10) Patent No.: US 9,685,407 B2
(45) Date of Patent: Jun. 20, 2017

(54) OPTIMIZED WIRES FOR RESISTANCE OR ELECTROMIGRATION

(71) Applicant: INTERNATIONAL BUSINESS MACHINES CORPORATION, Armonk, NY (US)

(72) Inventors: Lawrence A. Clevenger, LaGrangeville, NY (US); Baozhen Li, South Burlington, VT (US); Kirk D. Peterson, Jericho, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/260,675

(22) Filed: Sep. 9, 2016

(65) Prior Publication Data
US 2016/0379927 A1  Dec. 29, 2016

Related U.S. Application Data

(62) Division of application No. 14/561,514, filed on Dec. 5, 2014.

(51) Int. Cl.
H01L 23/48 (2006.01)
H01L 23/52 (2006.01)
(Continued)

(52) U.S. Cl.
CPC ........ *H01L 23/528* (2013.01); *G06F 17/5031* (2013.01); *G06F 17/5068* (2013.01);
(Continued)

(58) Field of Classification Search
None
See application file for complete search history.

(56) References Cited

U.S. PATENT DOCUMENTS 5,497,079 A  3/1996 Yamada et al.
6,268,291 B1  7/2001 Andricacos et al.
(Continued)

OTHER PUBLICATIONS

Christiansen et al., "Electromigration-resistance enhancement with CoWP or CuMn for advanced Cu Interconnects," IEEE International Reliability Physics Symposium (IRPS), 2011, 3E.3, 5 pages.
(Continued)

*Primary Examiner* — Calvin Choi
(74) *Attorney, Agent, or Firm* — Steven Meyers; Andrew M. Calderon; Roberts Mlotkowski Safran Cole & Calderon, P.C.

(57) ABSTRACT

Optimized metal wires for resistance or electromigration, methods of manufacturing thereof and design methodologies are disclosed. The method includes depositing metal material within openings and on a surface of dielectric material resulting in metal filled openings and a topography of recessed areas aligned with the metal filled openings. The method further includes depositing an alloying material over the metal material, including within the recessed areas. The method further includes planarizing the metal material, leaving the alloying material within the recessed areas. The method further includes diffusing the alloying material into the metal material forming alloyed regions self-aligned with the metal filled openings.

13 Claims, 5 Drawing Sheets

(51) Int. Cl.
    *H01L 29/40*     (2006.01)
    *H01L 23/528*     (2006.01)
    *H01L 23/532*     (2006.01)
    *G06F 17/50*     (2006.01)
    *H01L 23/522*     (2006.01)
    *H01L 21/02*     (2006.01)
    *H01L 21/321*     (2006.01)
    *H01L 21/66*     (2006.01)
    *H01L 21/285*     (2006.01)
    *H01L 21/288*     (2006.01)
    *H01L 21/311*     (2006.01)
    *H01L 21/44*     (2006.01)
    *H01L 21/768*     (2006.01)

(52) U.S. Cl.
    CPC ...... *G06F 17/5072* (2013.01); *G06F 17/5077* (2013.01); *G06F 17/5081* (2013.01); *H01L 21/0217* (2013.01); *H01L 21/2885* (2013.01); *H01L 21/28556* (2013.01); *H01L 21/31116* (2013.01); *H01L 21/31144* (2013.01); *H01L 21/3212* (2013.01); *H01L 21/7684* (2013.01); *H01L 21/7685* (2013.01); *H01L 21/76807* (2013.01); *H01L 21/76843* (2013.01); *H01L 21/76847* (2013.01); *H01L 21/76858* (2013.01); *H01L 21/76865* (2013.01); *H01L 21/76877* (2013.01); *H01L 21/76886* (2013.01); *H01L 21/76897* (2013.01); *H01L 22/20* (2013.01); *H01L 23/5226* (2013.01); *H01L 23/5329* (2013.01); *H01L 23/53228* (2013.01); *H01L 23/53233* (2013.01); *H01L 23/53238* (2013.01); *G06F 2217/82* (2013.01); *H01L 21/76834* (2013.01); *H01L 23/5283* (2013.01); *H01L 2924/0002* (2013.01)

(56) References Cited

U.S. PATENT DOCUMENTS

| | | | |
|---|---|---|---|
| 6,624,642 B1 | 9/2003 | Lyons et al. | |
| 6,633,085 B1 | 10/2003 | Besser et al. | |
| 7,074,709 B2 | 7/2006 | Young | |
| 7,115,502 B2 | 10/2006 | Jan | |
| 7,235,884 B1 | 6/2007 | McElheny et al. | |
| 7,396,759 B1 * | 7/2008 | van Schravendijk | H01L 21/76834 257/E21.575 |
| 8,329,577 B2 | 12/2012 | Lehr et al. | |
| 8,569,165 B2 | 10/2013 | Gordon et al. | |
| 2005/0142862 A1 | 6/2005 | Chun | |
| 2006/0027930 A1 * | 2/2006 | Edelstein | H01L 23/5226 257/762 |
| 2008/0311739 A1 * | 12/2008 | Besling | H01L 21/76834 438/643 |
| 2010/0297827 A1 | 11/2010 | Miyazaki | |
| 2012/0084745 A1 | 4/2012 | Liu et al. | |
| 2013/0252419 A1 | 9/2013 | Yang et al. | |
| 2016/0163651 A1 | 6/2016 | Clevenger et al. | |

OTHER PUBLICATIONS

Christiansen et al., "Geometry, kinetics, and short length effects of electromigration in Mn doped Cu interconnects at the 32nm technology node," IEEE International Reliability Physics Symposium (IRPS), 2012, 5E.1, 4 pages.

Au et al., "Selective Chemical Vapor Deposition of Manganese Self-Aligned Capping Layer for Cu Interconnections Microelectronics," Journal of the Electrochemical Society, 2010, vol. 157, No. 6, pp. D341-D345.

Hocheng et al., "A Comprehensive Review of End . . . Circuits Manufacturing" Int. J. Nano Technology (IJNT), 2002, 18 pages.

"List of IBM Patents or Patent Applications Treated as Related" 1 page.

Specification "Optimized Wires for Resistance or Electromigration" and Drawings in related U.S. Appl. No. 15/260,679, filed Sep. 9, 2016, 25 pages.

Office Action in related U.S. Appl. No. 15/260,679 dated Oct. 7, 2016, 9 pages.

Notice of Allowance from U.S. Appl. No. 14/561,514 dated Mar. 15, 2017; 8 pages.

\* cited by examiner

US 9,685,407 B2

OPTIMIZED WIRES FOR RESISTANCE OR ELECTROMIGRATION

FIELD OF THE INVENTION

The invention relates to semiconductor structures and, more particularly, to optimized metal wires for resistance or electromigration, methods of manufacturing thereof and design methodologies.

BACKGROUND

Electromigration is the transport of material caused by the gradual movement of ions in a conductor due to the momentum transfer between conducting electrons and diffusing metal atoms. The effect is important in applications where high direct current densities are used, such as in microelectronics and related structures. Also, as the structure size in integrated circuits (ICs) decreases, the practical significance of this effect increases.

There are two failure modes for electromigration for via interconnects and wiring structures in dual damascene copper structures: (i) via depletion; and (ii) line depletion. Via depletion occurs when electrons flow from a wiring line below into the via interconnect above. For this mode, slowing down the copper diffusion along the copper cap interface above the via interconnect is important. On the other hand, line depletion occurs when electrons flow from the via interconnect down to the wiring line below. For this mode, slowing down the copper diffusion under the via interconnect is important. Taking these different modes into consideration, a requirement for a specific wire may be driven by either performance or electromigration, but the resistance of all of the wiring will be determined by the electromigration requirements of a worst case electromigration.

SUMMARY

In an aspect of the invention, a method includes depositing metal material within openings and on a surface of dielectric material resulting in metal filled openings and a topography of recessed areas aligned with the metal filled openings. The method further includes depositing an alloying material over the metal material, including within the recessed areas. The method further comprising planarizing the metal material, leaving the alloying material within the recessed areas. The method further includes diffusing the alloying material into the metal material forming alloyed regions self-aligned with the metal filled openings.

In an aspect of the invention, a structure includes a plurality of via interconnects and wiring structures formed in a dielectric material. The plurality of via interconnects and wiring structures are copper lined structures having a planar surface covered by a capping layer and self-aligned alloying regions with the via interconnects and wiring structures under the capping layer, which inhibit electromigration.

In an aspect of the invention, a method includes: determining whether metal lines are to need electromigration resistance; assigning a shape of the metal lines that require electromigration resistance; constructing a mask for the shape; and determining timing for the assigned shape of the metal lines.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and, more particularly, to optimized metal wires for resistance or electromigration, methods of manufacturing thereof and design methodologies. In general, the optimization of the metal wires is accomplished by diffusing an alloying material into copper wiring structures during an annealing or subsequent deposition process as described in more detail herein. By diffusing the material into the copper wiring structures, an interface above the via interconnect (or wiring structure) is created which improves via depletion for electromigration.

More specifically, a structure is provided which includes alloyed copper metal lines above via interconnects and wide metal lines, provided in a self-aligned manner. The alloyed copper is aligned to the wider and deeper features as well as the via interconnects to strengthen the interface at the capping layer and therefore minimize electromigration effects in both wiring structures and via interconnects.

A design methodology is also provided in a design process whereby lines are determined to need electromigration resistance or not. The lines needing electromigration resistance are assigned a shape by constructing a mask pattern. This different mask pattern can be used to introduce alloying material, e.g., Mn as one example. The lines not requiring electromigration resistance are not affected and stay at a lower resistance. In embodiments, all lines close timing with this distinction noted.

The optimized wires can be manufactured in a number of ways using a number of different tools. In general, though, the methodologies and tools are used to form structures with dimensions in the micrometer and nanometer scale. The methodologies, i.e., technologies, employed to manufacture the optimized wires have been adopted from integrated circuit (IC) technology. For example, the structures, e.g., optimized wires, are built on wafers and are realized in films of material patterned by photolithographic processes on the top of a wafer. In particular, the fabrication of the optimized wires uses three basic building blocks: (i) deposition of thin films of material on a substrate, (ii) applying a patterned mask on top of the films by photolithographic imaging, and (iii) etching the films selectively to the mask.

Figure 1:
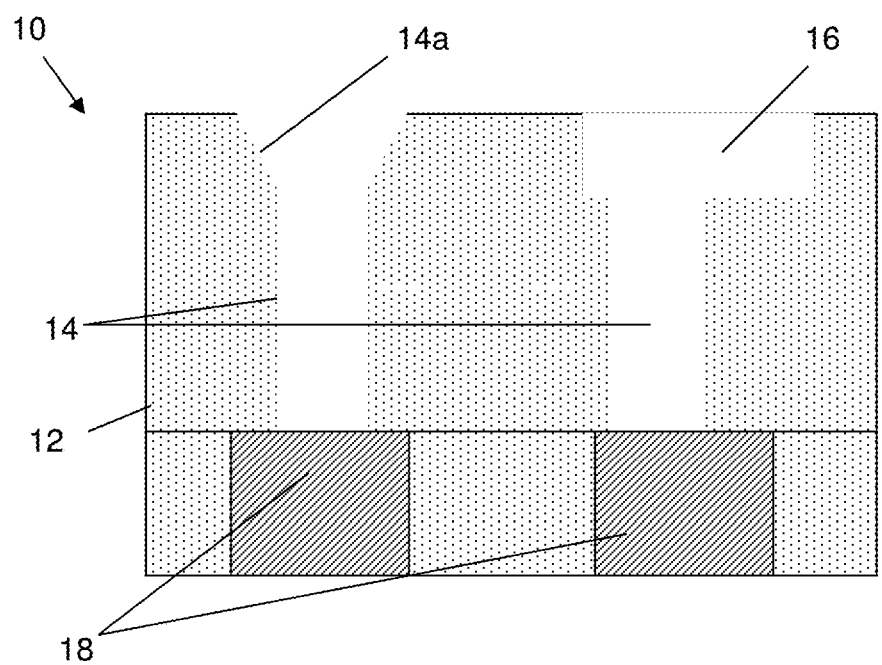
FIGS. 1-5 show structures and respective processing steps in accordance with aspects of the present invention.

FIG. 1 shows a structure and respective processing steps in accordance with aspects of the present invention. In particular, FIG. 1 shows a structure 10 comprising a patterned interlevel dielectric layer 12. In embodiments, the interlevel dielectric layer 12 can be, for example, an oxide material or other low-k dielectric material. The interlevel dielectric layer 12 includes a pattern of vias (narrow openings) 14 and trenches (wide openings) 16, formed using conventional dual damascene processes. In embodiments, the opening 14 can include a chamfered opening, depicted at reference numeral 14a. The chamfered opening 14a can be representative of a narrow trench and a via (which can result in a narrow wiring structure).

In embodiments, the dual damascene process includes the deposition of a resist on the interlevel dielectric layer 12. The resist is then exposed to energy (light) to form a pattern (openings). In this process, the openings will correspond to the width of the openings (trench) 16. A reactive ion etching (RIE) is then performed through the resist pattern to form the trenches 16. The resist can then be removed using conventional etchants and/or stripping techniques, e.g., oxygen ashing. Another resist is then formed on the structure and exposed to energy to form a pattern corresponding to the vias 14. A reactive ion etching (RIE) is then performed through the resist pattern to form the openings (e.g., vias) 14 thereby exposing the underlying wiring layers 18. The resist can be stripped using known etchants and/or stripping techniques, e.g., oxygen ashing. In embodiments, the openings 14 and trenches 16 can then be cleaned prior to the deposition of metal material, as described herein.

Figure 2:
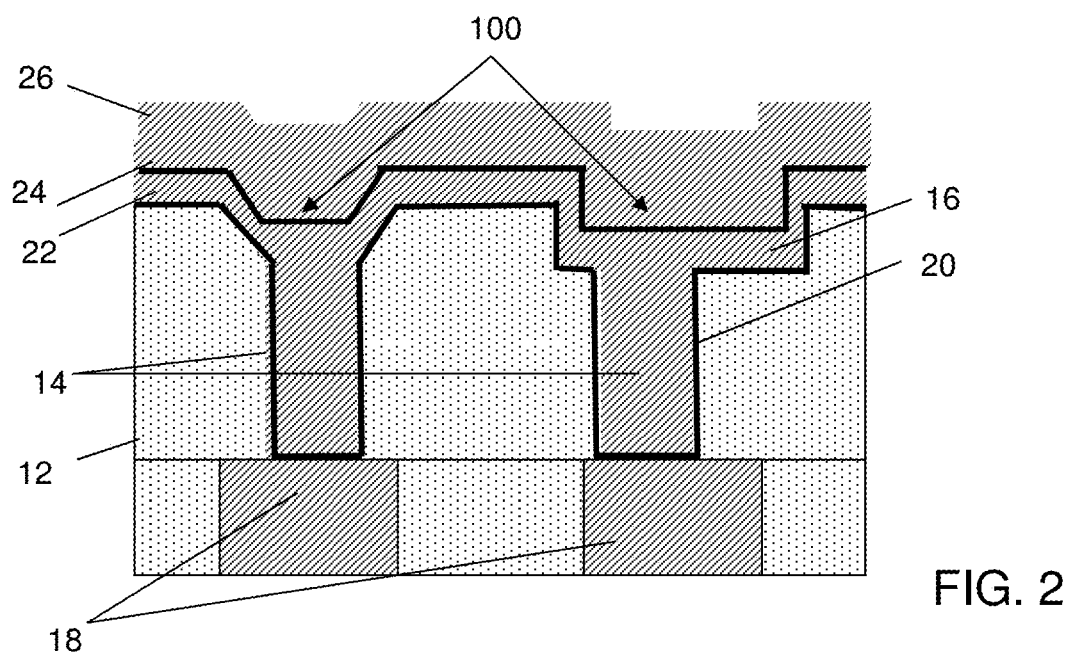

In FIG. 2, a via interconnect and metal wiring line are formed by first depositing liner material 20 on the sidewalls and bottom of the openings 14 and sidewalls of the trench 16. In embodiments, the liner material 20 can be tantalum and/or tantalum nitride; although other liner materials are contemplated by the present invention. The liner material 20 is in contact with the underlying metal wirings 18, and is deposited using conventional deposition methods such as chemical vapor deposition (CVD) processes.

A copper material 22 then fills the remaining portions of the openings 14 and trench 16 to form via interconnects and wiring structures, for example. In embodiments, the copper material 22 is deposited within the openings, e.g., openings 14 and trench 16, and on the surface of the dielectric material 12 using an electroplating bath. In embodiments, the electroplating bath can be somewhat conformal to super-filling to achieve the desired profile. As shown representatively at reference numeral 100, the deposition of the electroplated copper will result in a certain topography (e.g., slight recess aligned with the opening 14 and trench 16) due to the dimensions of the opening 14 and trench 16 as should be understood by those of skill in the art.

A copper material 22 then fills the remaining portions of the openings 14 and trench 16 to form narrow wiring structures and wiring structures, for example. In embodiments, the copper material 22 is deposited within the openings, e.g., openings 14 and trench 16, and on the surface of the dielectric material 12 using, for example, an electroplating bath. As shown representatively at reference numeral 100, the deposition of the electroplated copper will result in a certain topography (e.g., slight recess aligned with the opening 14 and trench 16) due to the dimensions of the opening 14 and trench 16 as should be understood by those of skill in the art. Depending on the width of the chamfered opening 14a (e.g., narrow trench), any topography (recess) of the copper material 22 will be above the opening itself. In this way, subsequent CMP processes will remove any additional material, e.g., Mn or other alloying metals, deposited in the copper material 22, thereby eliminating any subsequently formation of alloying as shown and described with regard to wider wire structures, e.g., in the processes shown in FIGS. 3-5.

Still referring to FIG. 2, a thin film 24 is deposited on the copper material 22, and within the recessed areas 100. In embodiments, the thin film 24 can have a thickness of about 0.1 to 200 nm. This thin film 24 is later subjected to an annealing process to diffuse into the copper material to form alloyed regions which improve copper resistance to electromigration. In embodiments, the thin film 24 can be an alloying material such as Mn that will diffuse out into metal line, e.g., copper material 22. In embodiments, other alloying metals can also be used as the thin film 24, e.g., Al, Co, Sn, Pd, C, Ca, Mg, and Hf. The thin film 24 can be deposited using a conventional deposition process, e.g., CVD.

Still referring to FIG. 2, an additional copper layer 26 is deposited on the thin film 24 in order to completely fill any remaining portions of the openings 14 and trench 16, e.g., fill in the recessed topography 100. In alternative embodiments, the additional copper layer 26 can be doped with the same alloying materials as noted with regard to the thin film 24. In this way, the thin film 24 can be eliminated, while still allowing these alloying materials to diffuse out into the metal line (copper material 22) to improve copper resistance to electromigration.

Figure 3:
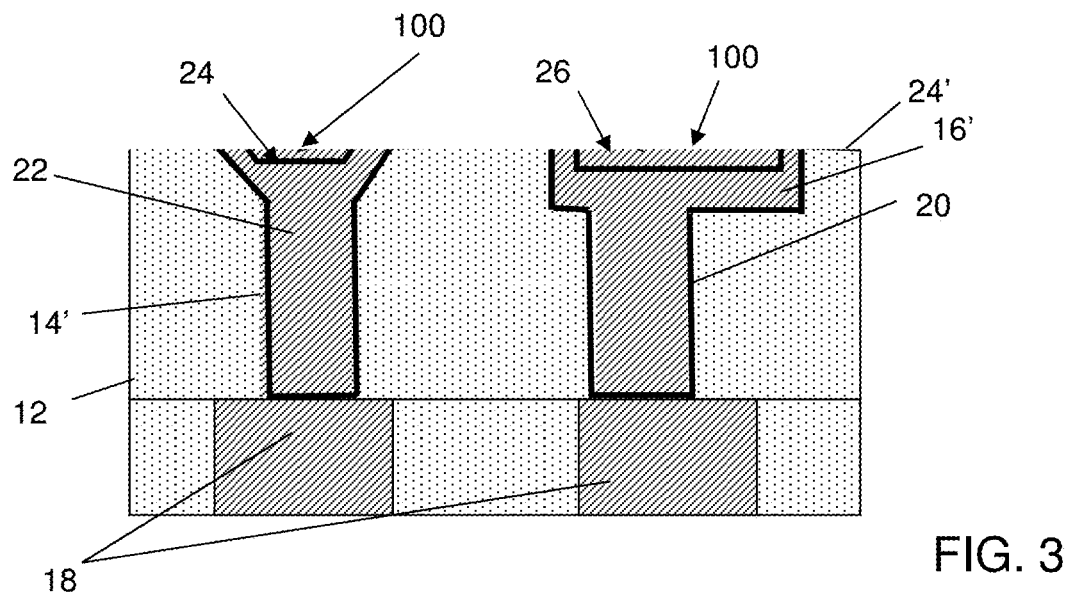

In FIG. 3, the structure undergoes a polishing process to planarize the layers 22, 26 and remove the excess material. After the planarization process, e.g., a chemical mechanical polishing (CMP) process, the via interconnect 14' (e.g., filled opening 14) and the wiring structure 16' (e.g., filled trench 16) will have a planar surface. In any of the embodiments, the planarized upper surface 24' will not remove material of the thin film 24 or the doped copper layer 26 aligned with the via interconnect 14' or the wiring structure 16', aligned with the underlying via interconnect 14'. The planar surface 24' provides many advantages over conventional structures which have a slight recess due to the need for subsequent etching processes, such as better scalability, a cleaner surface for further processing, e.g., back end of the line processes, as well as the elimination of defects.

Figure 4:
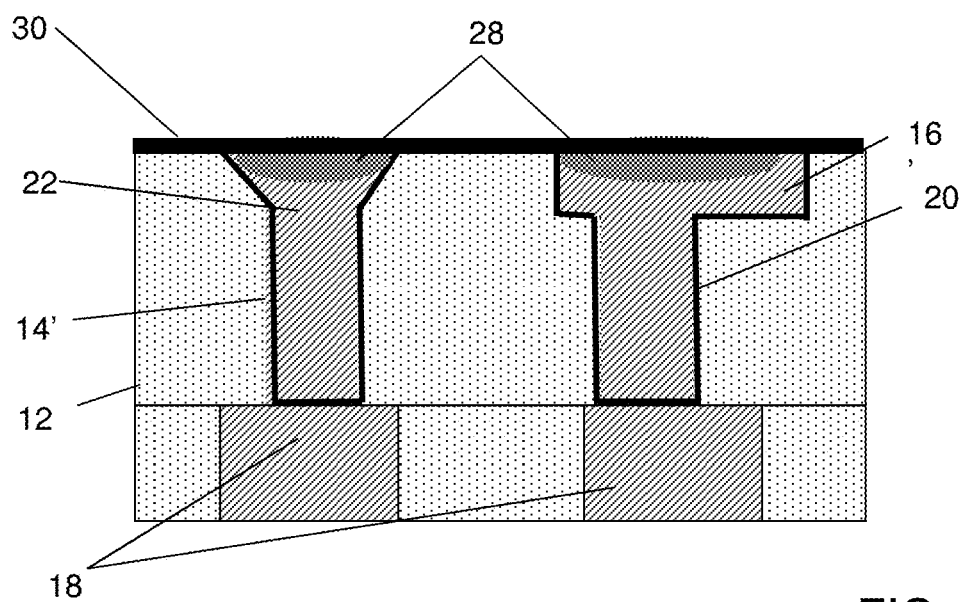

As shown in FIG. 4, the structure undergoes an annealing process to form self-aligned alloyed regions 28 and a subsequent deposition process to form a capping layer 30. In embodiments, the annealing process can be at about 400° C.; although other temperatures are also contemplated by the present invention, e.g., 200° C. to 600° C. would be a workable range. The capping layer 30 can be a silicon nitride layer formed by conventional deposition processes, e.g., CVD.

More specifically, the annealing process and/or the deposition of the capping layer 30 results in self-aligned alloyed regions 28 with the via interconnects 14' and within the wiring structures 16'. For example, the material of the thin film 24 or the doped copper 26, e.g., Mn, Al, Co, Sn, Pd, C, Ca, Mg, and Hf, will segregate or out-diffuse (where oxygen potential is higher than in bulk copper) into the copper material 22 during the annealing process and/or the deposition of the capping layer 30. This diffusion results in the self-aligned alloyed regions 28 (e.g., self-aligned with the via interconnects 14' and the wiring structures 16') which, in turn, enhances the strength of the interface of the copper material 22 and the capping layer 30. This will thus improve copper resistance to electromigration. Also, the location of the alloyed regions 28 will have a minimal impact on the electrical resistance of the copper via interconnect 14', e.g., filled via, and advantageously will be self-aligned due to the topography and planarization process.

Figure 5:
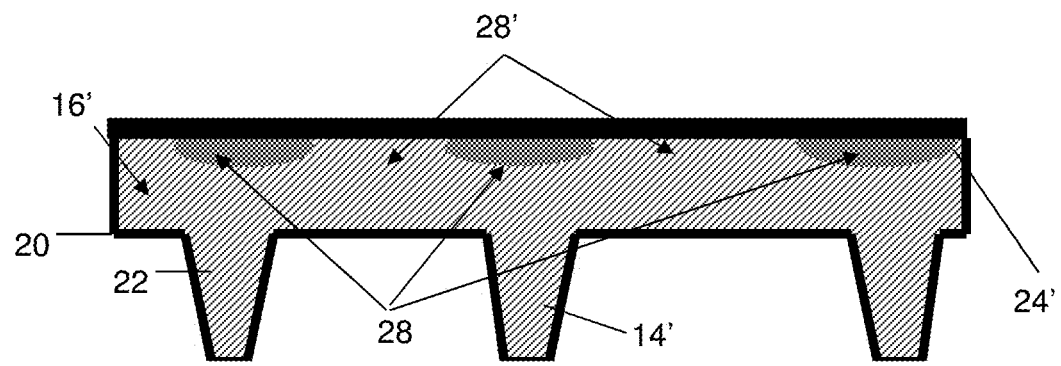

FIG. 5 shows a cross sectional view of a narrow wiring structure 16' (e.g., filled trench) of FIG. 4, along a length thereof. Here, it is again shown that the copper layers are polished to form a planarized upper surface 24', along the length of the wiring structure 16' (e.g., filled trench). The planarized upper surface 24' will be above the topography 100 thus ensuring that either the material of the thin film or the doped copper layer can be diffused with the copper material 22 during an annealing process (or deposition of capping layer) to form the alloyed regions 28. The alloyed regions 28 are self-aligned with the underlying via interconnects 14'. The capping layer 30 is provided above the alloyed regions 28.

It should be recognized by those of skill in the art that minimum width wires without underlying vias will not have any self-aligned alloying, as with the vias and the wider wires shown and described above. This is mainly due to the topography of the minimum width wires (no recessed portions), in combination with the mechanical polishing (CMP) process which would remove any alloying materials over these minimum width wires. Thus, as shown in FIG. 7, the minimum width wires, e.g., narrow portions 28' (without underlying vias), will not have any self-aligned alloying, as with the vias and the wider wires shown and described at reference numeral 28.

Figure 6:
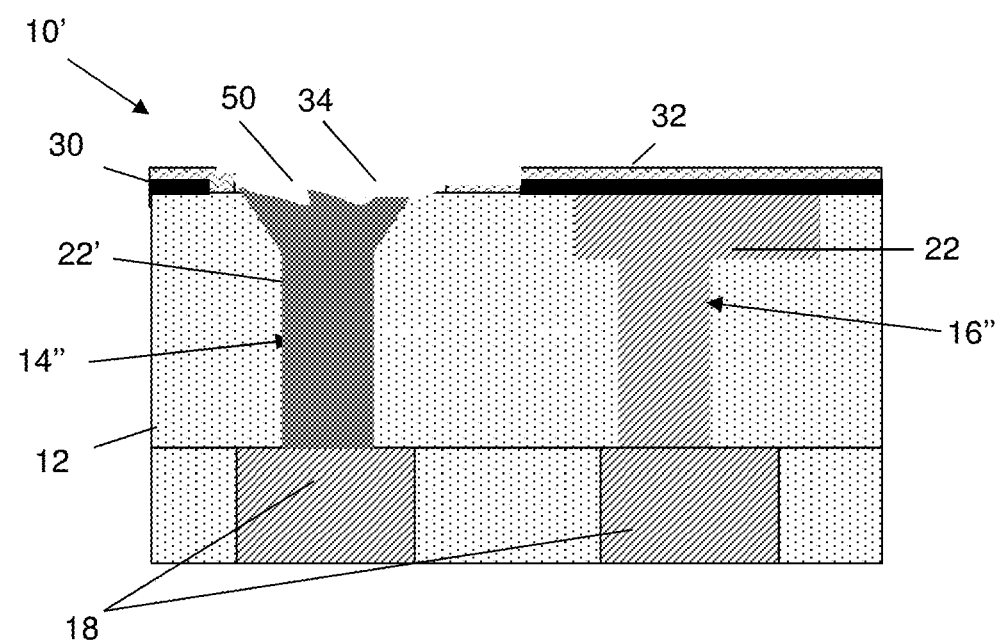
FIG. 6 shows a structure implementing the design methodology of FIG. 7.
Figure 7:
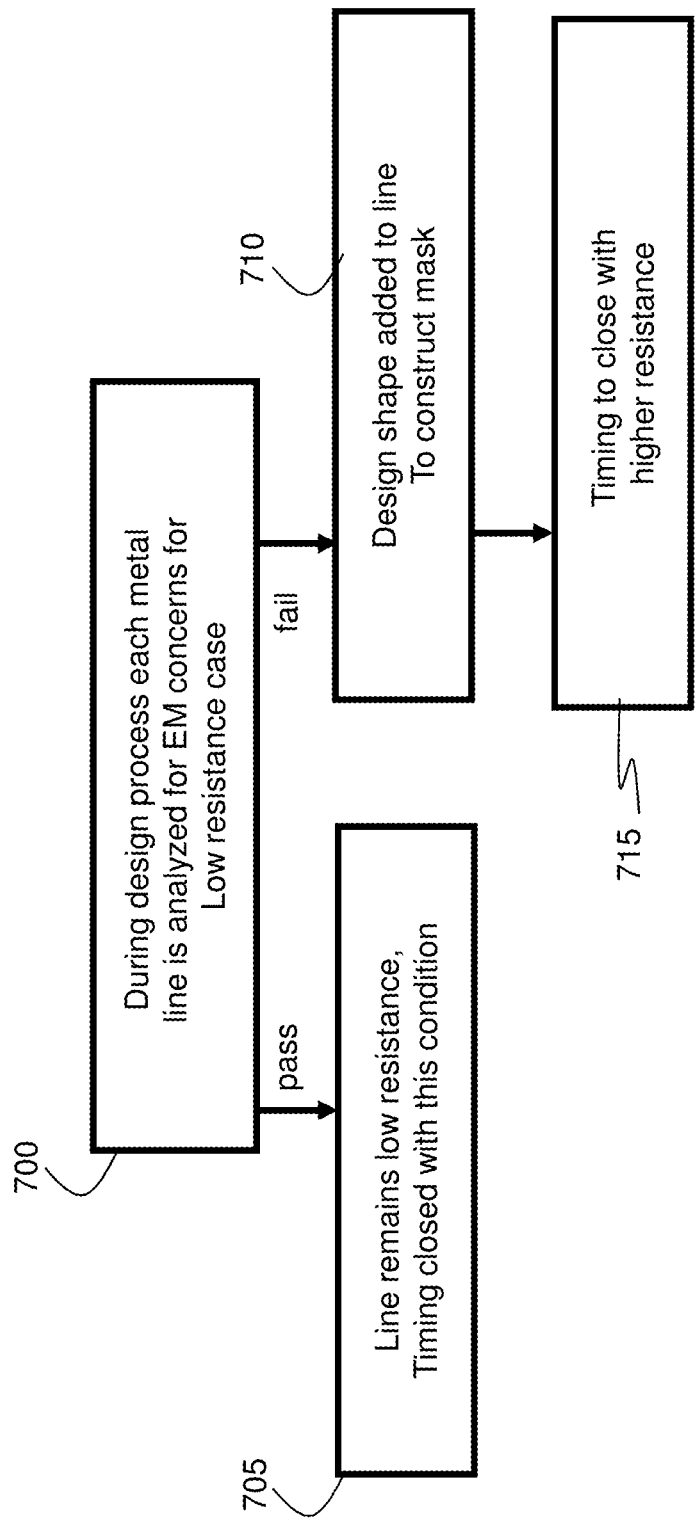
FIG. 7 shows a design methodology in accordance with aspects of the present invention.

FIG. 6 is an exemplary structure formed with the design methodology shown in FIG. 7. More specifically, in FIG. 6, the structure 10' includes a wiring structure 16" and a via interconnect 14", both filled with copper material 22. The copper material will be in contact with the underlying metal wirings 18. A capping layer 30 (silicon nitride) is formed over the surface of the copper material and interlevel dielectric layer 12. An opening 34 is formed in the capping layer 30 over the via interconnect 14", by an etching process. This etching process results in a recess or damaged area 50 above and about the via interconnect 14". A thin film 32 of Mn is deposited on the capping layer 30 and the copper material exposed by the opening 34 in the capping layer 30. The structure then undergoes an annealing process which diffuses the thin film 32 into the copper material of via interconnect 14", resulting in an alloyed copper material 22'. The extent of electromigration and electrical resistance of the copper wirings can be determined by the shape of the opening 34 in the capping layer 30, e.g., amount of diffusion occurs in the underlying copper material during the anneal of the structure 10'.

The design methodology of FIG. 7 can be used to refine the fabrication processes described with regard to the structure shown in FIG. 6. More specifically, the design methodology of FIG. 7 can be used to determine whether copper lines need electromigration resistance or not. The metal lines needing electromigration (e.g., via interconnect 14") are assigned a shape to be used in processing to adjust, e.g., introduce, alloying, whereas, the metal lines not needing electromigration (e.g., wiring structure 16") are not affected and stay lower resistance. This shape of the metal line can be provided by constructing a new mask (shape of mask) for forming the opening 34 in the capping layer 32. It should be understood by those of ordinary skill in the art that the above processes, e.g., patterned alloying of lines, can be applied to any methodology of patterned alloying of lines.

Referring still to FIG. 7, at step 700, during the design process each metal line is analyzed for electromigration (EM) concerns for low resistance case. For example, the design process can determine, through a circuit analysis, the current supplied to each metal wiring, e.g., via interconnect 14a and wiring structure 16", and whether the current is less than the EM threshold. This analysis can be performed using known design tools, such as those described with regard to FIG. 8, based on the dimensions of the metal wiring and the overall circuit requirements and functionality thereof.

If the metal wiring passes, the line will remain low resistance and the timing will be closed with this condition, at step 705. On the other hand, if the metal wiring fails, e.g., the line changed to EM resistant (e.g., high resistance), at step 710, a new design shape is added to the line in order to construct a mask. By changing the shape of the mask, it is now possible to control the out diffusion of material into the copper line to adjust the alloying effect and hence EM effects, e.g., decreasing conductivity and increasing resistance. The processes can then revert to step 700 in order to again determine electromigration (EM) concerns for low resistance based on the effects of the new mask construct.

Figure 8:
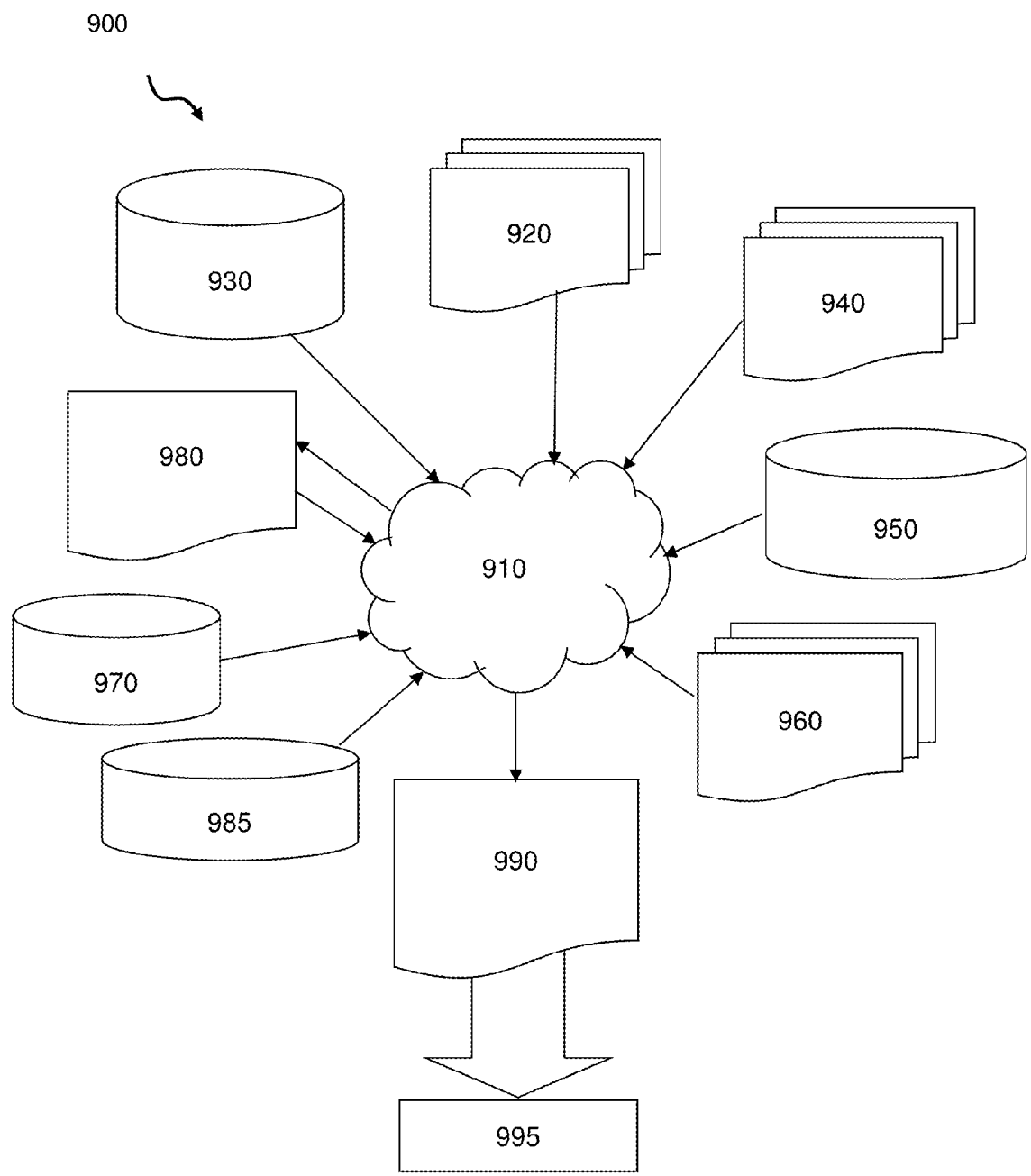
FIG. 8 is a flow diagram of a design process used in semiconductor design, manufacture, and/or test.

At step 715, the processes of the present invention determine the timing effects with the higher resistance line. For example, increasing the resistance of the wiring line will slow the propagation of a signal. By using an iterative process, the timing of the circuit can be readjusted, using the The design methodology of FIG. 7 can be implemented within the environment of the block diagram shown in FIG. 8. More specifically, FIG. 8 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIG. 6. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIG. 6. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIG. 6 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 6. In one embodiment, design structure 990 may comprise a compiled, executable HDL simulation model that functionally simulates the devices shown in FIG. 6.

Design structure 990 may also employ a data format used for the exchange of layout data of integrated circuits and/or symbolic data format (e.g., information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 6. Design structure 990 may then proceed to a stage 995 where, for example, design structure 990: proceeds to tape-out, is released to manufacturing, is released to a mask house, is sent to another design house, is sent back to the customer, etc.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising a plurality of via interconnects and wiring structures formed in a dielectric material, the plurality of via interconnects and wiring structures are copper lined structures having a planar surface covered by a capping layer and self-aligned alloying regions with the via interconnects and wiring structures under the capping layer which inhibit electromigration, wherein the via interconnects and the wiring structures comprise a first copper lined metal material within openings of the dielectric material and a copper lined doped metal material on top of the first copper lined metal material, the copper lined doped metal material forms the self-aligned alloying regions.

2. The structure of claim 1, wherein the self-aligned alloying regions comprise copper material diffused with one of Mn, Al, Co, Sn, Pd, C, Ca, Mg, and Hf.

3. The structure of claim 1, wherein the wiring structures include the alloying regions aligned with underlying copper interconnect structures.

4. The structure of claim 1, wherein the capping layer is silicon nitride.

5. The structure of claim 4, wherein the capping layer has a planarized surface of metal material.

6. The structure of claim 5, wherein the self-aligned alloying regions includes alloying material within recessed areas.

7. The structure of claim 6, wherein the self-aligned alloying regions comprise a thin film formed on copper with a thickness of between about 0.1 to 200 nm.

8. The structure of claim 7, wherein the thin film is Mn which diffuses into the copper.

9. The structure of claim 5, further comprising a barrier layer on sidewalls and a bottom of trenches which confines the aligned alloying regions.

10. The structure of claim 9, wherein the barrier layer is at least one of tantalum and tantalum nitride.

11. The structure of claim 1, wherein the copper lined doped metal material completely fill an opening of the dielectric material.

12. The structure of claim 1, wherein the self-aligned alloying regions are self aligned in a topography of recessed areas.

13. The structure of claim 12, wherein the planar surface is above the topography of recessed areas.

* * * * *